March 10, 1959 A. C. BUCK ET AL 2,876,725
SOLDER-FREE CEMENTED BODY-SEAMED SHEET METAL CONTAINER
AND METHOD OF FABRICATING THE SAME
Filed Sept. 6, 1956
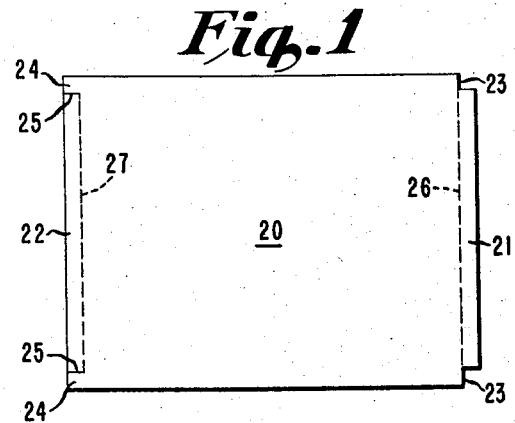
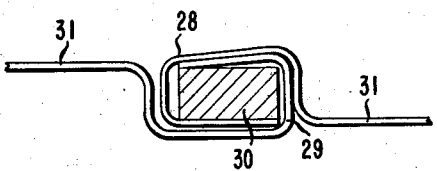
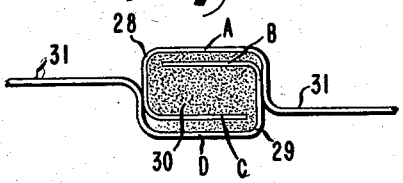
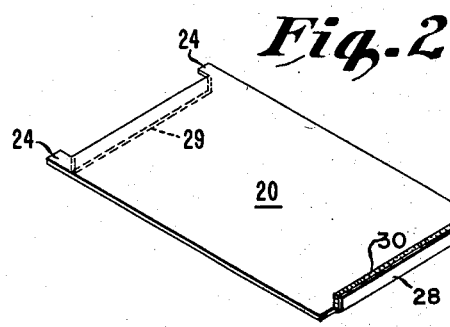
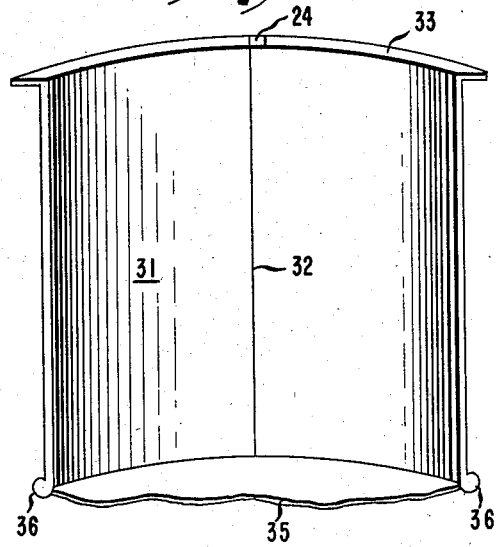
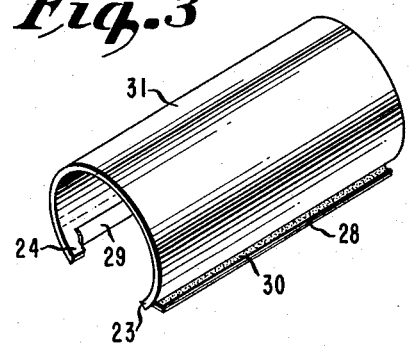
INVENTORS
ALLEN CLELAND BUCK
JOHN P. SERMATTEI
BY Charles E. Bartsch
AGENT United States Patent Office 2,876,725
Patented Mar. 10, 1959

2,876,725

SOLDER-FREE CEMENTED BODY-SEAMED SHEET METAL CONTAINER AND METHOD OF FABRICATING THE SAME

Allen Cleland Buck, Waynesboro, Va., and John P. Sermattei, Drexel Hill, Pa., assignors to E. I. du Pont de Nemours and Company, Wilmington, Del., a corporation of Delaware Application September 6, 1956, Serial No. 608,251

5 Claims. (Cl. 113—120)

This invention relates to sheet metal containers having a solder-free cemented side seam. More particularly the invention relates to certain terephthalate copolyester adhesive compositions adapted for use as a solder replacement in the manufacture of a sheet metal container body-shell having a cemented side-seam, and to a method of fabricating a solder-free sheet metal container body-shell wherein the terephthalate copolyester adhesive serves as the bonding means and as a sealant for the body-seam.

Metal ordinarily used in tin-can fabrication is sheet steel having a thin coating of tin thereon ordinarily corresponding to .25 up to about 1.5 pounds of tin per about 218 square feet of tin-coated metal surface. Although the percentage of tin per can is small, annual consumption by the packaging industry is tremendous. Since tin is a critical raw material with no domestic source of supply, conservation by minimizing its use is highly desirable.

Substitution of an organic polymer composition as an adhesive and seam caulking compound for the tin/lead solder ordinarily used in container fabrication provides an opportunity for tin conservation. Although divergent compositions have been proposed for this purpose, heretofore known and currently available adhesive and seam caulking compositions have not provided fully acceptable results adequate to permit significant replacement of the metal solder. Innumerable types of products are packaged in tin cans and wet-pack food products and beverages are ordinarily processed or pasteurized in the can. The can and the resulting package are subjected to a wide variety of physical conditions during processing, when handled and transported, and during storage. The following several cardinal requirements are pertinent to organic compositions useful as solder replacements in the manufacture of a tin can and similar containers fabricated from sheet metal and having a side seam in its tubular body:

(1) Toughness and adhesion over a wide temperature range, particularly up to a temperature of at least 250° F.

(2) Excellent initial adhesion and retained adhesion to metals ordinarily used in container fabrication.

(3) Immediate development of substantially full strength adhesion during application.

(4) Resistance to creeping and flow at processing temperatures involved with the products being packaged.

(5) Chemical inertness to the variety of products which are packaged in cans, particularly in the pH range of 2 to 8.

(6) Freedom from nocuous, odoriferous and taste-contributing constituents.

(7) Good permanence on aging in the seam, that is, freedom from loss of adhesion and from development of embrittlement on aging.

(8) Retention of flexibility at sub-freezing temperatures.

(9) Suitable physical properties for application by conventional methods of applying adhesives, such as for example, solubility in practical volatile organic solvents for solution application or practical melt temperatures and melt viscosities for hot-melt application.

(10) Stability of the organic adhesive composition prior to its application to the metal substrate.

Many organic adhesives exhibit excellent adhesion to metal adequate to cement the seam of the tubular body of the container in place of solder. However, because these adhesives are deficient in other of the aforementioned cardinal requirements, particularly deficiency in chemical resistance, their use is limited. The deficiencies ordinarily prevent the use of known organic adhesives as a metal solder replacement in metal cans used in the packaging of wet-pack food products and aqueous beverages. Containers used for such packaging represent a predominating proportion of the sheet-metal containers manufactured. Hence, a solder-free, cemented sheet metal container having substantially universal utility should be fabricated with a solder-replaceable organic adhesive which at least satisfies the requirements conforming with the conditions associated with the packaging of food and beverage products. Heretofore, there have been no practical organic adhesive compositions which satisfy these requirements. On the other hand, where the cardinal requirements are partially met, currently available solder-replaceable adhesives have found utility in the manufacture of limited-use containers, the use of which involves less critical packaging conditions and in which chemical resistance is less pertinent.

The primary object of this invention is to provide a solder-free sheet metal body-shell for container fabrication having a seam cemented and caulked with an organic adhesive composition characterized by physical and chemical properties which adequately conform to the cardinal requirements defined above for a solder-replaceable organic adhesive useful in the fabrication of such sheet metal containers. Another object is to provide a solder-free sheet metal body-shell having a seam cemented and caulked with an organic adhesive adequate for fabrication of containers widely useful for the packaging of wet-pack food products, aqueous beverages and other products ordinarily packaged in tin cans. A further object is to provide sheet metal container body blanks coated on at least one seam-forming surface with a fusible organic adhesive composition which on fabrication of the body blank as a seamed tubular body-shell is cemented and caulked at the seam adequately to withstand physical conditions associated with processing of products in the resulting container and physical conditions ordinarily encountered during transportation and storage of the resulting package. Still another object is to provide a method of fabricating the described sheet metal container body-shell having a solder-free seam cemented and caulked with an organic adhesive.

These and still other important objects hereinafter disclosed are accomplished by applying certain fusible adhesive compositions comprising a terephthalate copolyester to the surface of at least one opposing seam-forming surface of a companion pair of seam-forming surfaces of a sheet metal container body blank, forming the container body blank into a tubular body-shell having a locked body seam defined by the companion pair of seam-forming surfaces formed into a pair of opposing seam-forming hooks which in an engaged, compressed and locked state confine the adhesive in the resulting seam cavity, heat-activating the adhesive confined in the seam cavity by heating it to a temperature above the melting point to cause it to at least partially liquefy within the seam cavity and thereafter solidifying the liquefied adhesive to laminate the metal plies defined by the locked seam-forming hooks and simultaneously caulk the seam. The resulting cemented tubular body-shell is thereafter fabricated as a solder-free container by seaming a conventional end-closure to at least one end of the tubular body-shell. Fusible terephthalate copolyester adhesive compositions useful in cementing and caulking the body seam in place of solder comprise a polymeric ester product of a benzenedicarboxylic acid component comprising terephthalic acid, at least one saturated aliphatic dicarboxylic acid having the general formula $$HOOC(CH_2)_xCOOH$$

where $x$ is an integer ranging from 2 to 8, and at least one polymethylene glycol having from 2 to 6 methylene groups per molecule, the terephthalic acid component representing at least 30 mol percent and the saturated aliphatic dicarboxylic acid representing 15 to 60 mol percent of the total dicarboxylic acid.

Referring to the drawings: Figure 1 is a view of a flat sheet metal container body blank 20 cut, punched or stamped from either a metal sheet or a roll of sheet metal to provide the body blank with seam-forming surfaces 21 and 22. This represents the product of the first stage of a conventional can bodymaker machine.

Figure 2 is a perspective view of an adhesive coated body blank resulting from application of the terephthalate copolyester adhesive to the seam-forming surface 21 of Figure 1 and forming the seam hooks 28 and 29 from the respective seam-forming surfaces 21 and 22 by bending the body blank at the respective fold-lines 26 and 27.

Figure 3 is a perspective view of the container body blank at an intermediate stage of fabrication as a tubular shell 31. The inner surface of seam-forming hook 28 carries the coating or layer of adhesive 30 which is to be confined within the seam cavity when hooks 28 and 29 are engaged and bumped to lock them together. In seam-forming operation, tabs 24 overlap on the body-shell at edges 23 and, if desired, these tabs can be spot-welded at the overlapped area of the body-shell.

Figure 4 is a cross-sectional view of the locked seam confining the adhesive 30 within the seam cavity defined by the locked seam-forming hooks 28 and 29.

Figure 5 is another cross-sectional view of the locked seam, similar to Figure 4, representing the seam after the confined adhesive 30 was heat-activated within the seam cavity to cause it to at least partially liquefy and then solidified, thereby laminating the seam-forming metal plies and caulking the seam. In this figure, the cemented and caulked seam appears as a 4 ply metal laminate in which plies A and C are represented by the seam-forming hook 28 and plies B and D are represented by seam-forming hook 29. Initially adhesive 30 only fills the cavity or void between ply B and ply C, but when in the liquefied state, adhesive 30 is free to migrate between plies A and B and plies C and D.

Figure 6 is a cross-sectional view of the fabricated sheet metal container wherein the body-shell 31 having a solder-free adhesive-cemented and caulked seam 32, is sealed at one end with an end-closure 35 attached to the body-shell 31 by a double seam 36. The open end of the body-shell has flange 33 as a means for double-seaming another end-closure to the tubular body-shell 31 subsequent to filling the container with the product to be packaged. Flange 33 includes tab 24 in its architecture. A similar flange constitutes part of the seam 36 at the sealed end of the tubular container.

The architecture and fabrication of tubular tin-cans of similar structure but having a soldered body seam are described in detail with illustrations in "The Canned Food Reference Manual," second edition 1943, published by the American Can Company, chapter 4, pages 45 to 52.

The following represents a general outline of the method of fabricating a sheet metal container body-shell having a solder-free cemented body seam in accordance with this invention. A metal sheet of tin-plated steel was cut to form the sheet metal body blank 20 of Figure 1. One end of the blank was notched to the fold line 26 to define a seam-forming surface 21. The other end of the body blank was slit at 25 to the fold line 27 to define a companion seam-forming surface 22. Adjacent to this surface are tabs 24 corresponding to the notches defined by the notch edges 23.

Adhesive 30 was applied to the seam-forming surface 21 and the adhesively coated surface was upwardly bent along fold-line 26 to define the engageable seam-forming hook 28 of Figure 2 and the seam-forming surface 22 was oppositely bent; that is, downwardly bent to define the engageable seam-forming hook 29. The adhesive 30 is applied to the seam-forming surface by a conventional method, such as for example, by spraying, brushing, extrusion, roller coating, printing, as a hot-melt, or as a preformed ribbon, tape or similarly shaped strip of adhesive. The particular method of adhesive application dictates the sequence of adhesively coating the body blank. Application of liquid adhesive comprising a solution or dispersion of the essential copolyester in a volatile organic diluent by roller coating, gravure printing, or spraying was most conveniently accomplished when the body blank is still in the form of a flat sheet. Adhesive applied by extrusion either as a cold solution or as a hot-melt was preferably applied after the body blank is provided with the seam-forming hooks which can serve as troughs to receive the extruded adhesive.

In some operations it was found to be desirable to cast the adhesive as a film of appropriate thickness or extrude it as a tape or wire-like strip and apply the pre-formed ribbon or strip of adhesive to the seam-forming surface of the body blank. In applying the pre-formed adhesive strip to the metal substrate it was ordinarily necessary to provide means for superficially anchoring the normally non-tacky solid adhesive to the substrate. Spot-heating the seam-forming area to heat-activate the adhesive was found to be adequate for superficially anchoring the solid adhesive to the seam area. Alternatively the solid ribbon of adhesive was solvent-activated prior to application to the seam area of the metal substrate. On cooling the applied heat-activated adhesive below the melt temperature or volatilizing the solvent from the applied solvent-activated adhesive strip, the adhesive was adequately anchored to the substrate for subsequent mechanical operations of container fabrication.

The body blank carrying a layer of adhesive 30 on the surface of the seam-forming hook 28 was formed into the tubular shell 31 as shown in Figure 3 and the seam-forming hooks 28 and 29 were engaged and locked as shown in Figure 4. The adhesive 30 on the surface of the seam-forming hook 28 was confined within the seam cavity defined by the locked hooks 28 and 29. As shown in Figure 4, the adhesive was not bonded to the opposing hook 29 at this stage.

The locked seam confining the adhesive was heated to activate the adhesive whereby the liquefied adhesive migrates within the seam cavity to flow between the metal plies A and B and plies C and D, representing portions of the seam-forming hooks 28 and 29 as shown in Figure 5. The seam and confined adhesive was cooled to a temperature below the melting point of the adhesive to solidify the adhesive, thereby laminating together the metal plies A, B, C and D representing the seam-forming hooks 28 and 29, and caulking the seam.

The container body-shell now having a solder-free, cemented and caulked body seam was then fabricated in a conventional manner as a container by first forming a seaming flange 33 at each end of the tubular body-shell 31 and attaching to one flanged end, a preformed end-closure having an annular groove to receive the flange for double-seaming. The annular groove contained a conventional end-seam caulking compound which adequately seals the end-seam when the end-closure and body-shell are double-seamed together without the use of metal solder. Figure 6 illustrates end-closure 35 double-seamed to the body-shell 31 having the cemented and caulked seam 32. After the container was filled with a packageable product and was ready for sealing, a second end-closure was double-seamed to the open end of the container by means of flange 33.

The following examples represent preferred compositions of terephthalate copolyester adhesives particularly useful for cementing and caulking side-seams of sheet metal container bodies. The term "cementing and caulking" as used throughout the specification defines concurrent operations rather than independent operations of cementing and caulking. The term is quantitatively indicative that the amount of cementing, bonding or laminating adhesive is adequate to provide the cemented seam with a leak-proof seal under ordinary packaging conditions.

EXAMPLE 1

|  | Parts by wt. |
|---|---|
| Dimethyl terephthalate | 30.78 |
| Dimethyl sebacate | 29.86 |
| Ethylene glycol | 39.27 |
| Catalyst—calcium acetate | .09 |
|  | 100.00 |
| By-product methanol | 18.46 |
| Copolyester monomer mixture | 81.54 |

The indicated reactants and ester-interchange catalyst were charged into a reaction vessel, agitated continuously and heated while liberated methanol was removed by distillation. Heating was continued until the temperature of the residual monomeric copolyester composition reached 437° F. Then this intermediate copolyester product was transferred to a polymerization vessel where in the presence of .04 part of antimony trioxide per 100 parts of the intermediate monomeric product, it was heated to about 482° F. Then vacuum distillation at 2 mm. Hg was initiated to remove excess ethylene glycol while the temperature of the resulting copolyester composition increased to 520° F. Heating was conttinued for two hours in the temperature range of 520–530° F. The resulting product was drained into suitable vessels interiorly coated with polytetrafluoroethylene resin to inhibit sticking. The product was allowed to cool and solidify.

During the polymerization, 21.35 parts of ethylene glycol were removed from the 81.54 parts of monomeric copolyester composition. The resulting copolyester of terephthalic acid, sebacic acid and ethylene glycol had a terephthalic acid content corresponding to 55 mol percent and a sebacic acid content corresponding to 45 mol percent based on the total content of dicarboxylic acid. The inherent viscosity was about .60 based on the relative viscosity of a solution of .6 gram of copolyester in 100 ml. of meta cresol. The inherent viscosity was calculated as follows:

$$\text{Inherent viscosity I. V.} = \frac{2.3 \log \text{relative viscosity}}{C}$$

where the relative viscosity is the ratio of the viscosity of the indicated solution to the viscosity of the solvent and C is the concentration of the copolyester in 100 ml. of solution.

The adhesive product of Example 1 was dissolved in refrigeration grade methylene chloride (dichloromethane) in an amount corresponding to 17% by weight of dissolved copolyester. This solution which had a viscosity of 50 seconds du Pont-Parlin No. 10 cup at 25° C. was applied to the seam-forming surface 21 of the body-blank by roller-coating to provide, on volatile loss of solvent, a dry adhesive layer about 2 mils thick. The resulting adhesive-coated body blank was formed as a seamed body-shell and the adhesive confined in the locked seam was activated and liquefied by heating the metal seam at 350° F. for 10 seconds. On solidification of the activated adhesive, the seam was adequately cemented and caulked. The resulting container filled with lubricating oil and sealed with an end-closure provided a leak-proof package which withstood rough handling corresponding to that ordinarily encountered in transportation.

In another test, a single coat of the adhesive solution was applied to both seam-forming surfaces 21 and 22 in an amount corresponding to about 1 mil of dry adhesive on each surface. In this operation, the adhesive was applied to surface 21 on one side of the body-blank and to surface 22 on the reverse side of the body-blank. This manner of application was necessary in order that the adhesive on the two indicated surfaces be confined within the seam cavity. The 1 mil adhesive coating on each surface 21 and 22 provided a total adhesive coating corresponding to 2 mils confined in the seam cavity when the coated blank was formed into a seamed body-shell. The confined adhesive was activated by heating the formed seam for 10 seconds at 350° F. and then cooled. The resulting seamed body-shell was fabricated as a container as described above, filled with lubricating oil and sealed. This resulting package also withstood rough handling without leakage.

Still other body-blanks were similarly adhesively coated by spraying on either surface 21, surface 22 or both 21 and 22 to provide a total adhesive thickness ranging from .5 to 10.0 mils to be confined in the seam cavity. These blanks were fabricated into seamed tubular body-shells, the confined adhesive heat-activated at 350° F. to at least partially liquefy the adhesive and then cooled below the melt temperature. Thereafter the body-shells were fabricated into containers as previously described. Although .5 mil of adhesive provided a satisfactory anchorage between the metal plies of the seam, the resulting package was not consistently free from leaks. An adhesive coating of at least 1 mil was preferred to provide the desired freedom from leakage. Although an adhesive thickness of 10 mils was operative, the cavity defined by the locked seam has limited capacity and the volume of adhesive corresponding to the adhesive layer of 10 mils thickness should not exceed the capacity of the cavity. An adhesive thickness in the range of 1 to 5 mils was found to be most suitable. Excessive amounts of adhesive interfere with bumping or compressing the seam-forming hooks in the engaging and locking operation of seam formation. Seams of large containers, such as pails and drums, fabricated from heavy gauge metal are bulkier than those of the ordinary tin-can and consequently have seam-cavities of larger capacity to receive a greater amount of adhesive.

As an alternate method of applying the adhesive, the solution of the copolyester product of Example 1 in methylene chloride was cast as a film by a conventional film casting method. The resulting film having a thickness of about 5 mils was slit into ribbons or strips about .3 inch in width. A strip of this preformed solid ribbon of adhesive of length corresponding to the length of the seam-area 21 was placed on this seam-forming surface of the flat body blank which was momentarily spot-heated with a series of microflames to provide sufficient heat to partially fuse the surface of the adhesive ribbon and superficially anchor it to the metal on cooling. A press faced with a surface coating of polytetrafluoroethylene resin was found useful in pressing the adhesive ribbon to the heated metal surface, the polytetrafluoroethylene being non-adhering to either the heated metal or the adhesive ribbon.

The body blank having the ribbon of adhesive anchored thereto was formed as a solder-free, cemented side-seam sheet metal body-shell and thereafter fabricated as a container following the general process outlined above. In the operation, the adhesive confined within the seam cavity was heat-activated for 10 seconds at 350° F.

The resulting seamed-container was filled with ordinary low viscosity lubricating oil and the container was sealed by double-seaming a conventional metal end-closure to the flanged open end. The resulting package did not leak, indicating satisfactory cementing and caulking by the copolyester adhesive. No leaks developed when the package was roughly handled, such as dropping from a height of six feet or by significantly denting the body at the seam. The adhesive was strongly anchored to the metal and was adequately elastic and flexible that it did not fracture when the seam was subjected to significant deformation. Another similarly prepared cemented body-shell was tested for seam leaks under 10 pounds air pressure and was found to be leak-proof.

In still another alternate method of applying the adhesive, the adhesive in a hot-melt liquefied state was extruded directly on to the surface 21 as a ribbon about 3 mils thick and about 0.3 inch wide. The adhesive-coated body-blank was fabricated as a cemented container body-shell as outlined, activating the adhesive confined in the seam cavity by heating for 10 seconds at 350° F. The resulting seamed shell was fabricated as a container and a package was formed by sealing lubricating oil in the resulting container. This package was found to be equal in leak-proof performance to the other described packages in which the copolyester adhesive of Example 1 was used to cement and caulk the solder-free seam.

Another suitable terephthalate copolyester adhesive is represented by the following example based on a ternary dicarboxylic acid mixture:

EXAMPLE 2

| | Parts by wt. |
|---|---|
| Dimethyl terephthalate | 24.10 |
| Dimethyl isophthalate | 10.30 |
| Dimethyl sebacate | 27.10 |
| Ethylene glycol | 38.41 |
| Catalyst—calcium acetate | .09 |
| | 100.00 |
| By-product methanol | 18.80 |
| Mixed ester monomer composition | 81.20 |

The preparation of the ester monomer composition was carried out as described in Example 1, driving off 18.8 parts of methanol. The monomeric ester residue was transferred to a polymerization vessel and heated in the presence of .04 part of antimony trioxide per 100 parts of ester mixture to a temperature of 482° F. Thereafter heating was continued under 2 mm. Hg vacuum to a temperature of 530° F., distilling off ethylene glycol until the inherent viscosity of the copolyester was .82 determined as described in Example 1. Then the polymer was removed to cool and solidify in suitable containers for subsequent use. The resulting copolyester product had a terephthalic acid content of 42 mol percent, an isophthalic acid content of 18 mol percent and a sebacic acid content of 40 mol percent based on the total mols of dicarboxylic acid.

This copolyester product was melt extruded and cooled to provide a preformed ribbon of adhesive about 5 mils thick. This ribbon of adhesive was subsequently applied to the seam-forming area as described in Example 1 and the body-blank was converted to a seamed body-shell. The ribbon of solid adhesive confined in the seam cavity was activated and liquefied by heating for 5 seconds at about 500° F. and then solidified by cooling. The resulting seamed tubular body-shell was fabricated as a container which was filled with lubricating oil and sealed with an ordinary end-closure. This package was non-leaking. Deformation of the cemented and caulked seam did not cause fracturing of the seam.

In another test, the copolyester product of Example 2 was melt extruded at 500° F. directly into the trough defined by the seam-forming hook 28 of the body-blank. The seam was immediately locked. The adhesive confined in the seam cavity was activated by heating for 5 seconds at 500° F. and then solidified by cooling. The resulting seamed body-shell fabricated as a container and used to package lubricating oil provided a package equally as satisfactory as that in which the adhesive was applied as a preformed ribbon or tape.

A disadvantage of hot-melt application is deficiency in the hot-melt pot-life of the copolyester adhesive. Because melt temperatures are sufficiently high to cause volatilization of certain polymer components, the melt pot-life of the adhesive is ordinarily relatively low. The copolyester product of Example 2 maintained in an open melt-pot at 500° F. gelled in about 4½ hours. However, when the melt-pot was blanketed with carbon dioxide, the hot-melt adhesive remained at useful fluidity at 500° F. for about 42 hours. Specimen tin-coated sheet steel laminates bonded with the copolyester adhesive product of Example 2 at various stages of melt-pot life provided the following results which show the effect of aging in the melt-pot.

*Table 1*

MELT-POT STABILITY

| Adhesive Age in Melt Pot | ½ Hour | 6 Hours | 42 Hours |
|---|---|---|---|
| | Lbs. | Lbs. | Lbs. |
| Bond Strength—Initial | 21.5 | 19.5 | 8.5 |
| Bond Strength—After 30 days | 29 | 28.5 | 4.0 |

Corresponding specimen laminates immersed in boiling water for 75 minutes and checked for bond strength after removal from the water showed that laminates prepared from the material aged 42 hours in the melt pot delaminated in 8 minutes in comparison with full retention of the bond strength with adhesive aged ½ hour and 6 hours in the melt pot.

Corresponding specimen laminates prepared from the ½ hour and 6 hour melt-aged adhesive, stored for 90 minutes at 0° F. and then folded through an 180° angle between the fingers showed that the adhesive remained elastic or flexible, retained its bond strength and did not delaminate.

Additional tests indicated that age-degradation of the molten adhesive in the melt-pot was sufficiently significant that for most applications it is ordinarily impractical to use the adhesive as a side-seam cement after aging 24 hours in the melt pot.

Containers fabricated from sheet metal body-shells in which the seam was cemented and caulked with the adhesive composition of Example 2 which has not been subjected to significant heat-aging at melt temperatures were subjected to established wet-pack food and beverage packaging tests used by the container industry for this evaluation. The containers satisfactorily withstood the physical conditions associated with heat-processing and pasteurization of food and beverage products in the container, and associated with storage and transportation of such packaged products.

The following adhesive composition is representative of a copolyester derived from a quaternary dicarboxylic acid mixture:

EXAMPLE 3

| | Parts by wt. |
|---|---|
| Monomeric bis(beta-hydroxyethyl) terephthalate | 38.00 |
| Monomeric bis(beta-hydroxyethyl) isophthalate | 38.00 |
| Monomeric bis(beta-hydroxyethyl) adipate— 66.8 parts in 33.2 parts of ethylene glycol | 13.20 |
| Monomeric bis (beta-hydroxyethyl) sebacate | 10.80 |
| Catalyst—antimony oxide | .05 |
| | 100.05 |

The respective monomeric bis(beta-hydroxyethyl) esters of terephthalic acid, isophthalic acid and sebacic acid were prepared by ester interchange reaction between the corresponding dimethyl esters and ethylene glycol, using calcium acetate as the interchange catalyst and volatilizing the methanol liberated during the reaction. The ethylene glycol was used in the proportion of two mols per mol of the dimethyl ester. The ester interchange reaction was carried out at a temperature progressively increased from 284° F. to a final temperature of 439° F.

The bis(hydroxyethyl) adipate was prepared by direct esterification of adipic acid with excess ethylene glycol. The ethylene glycol was used in the proportion of 6.5 mols per mol of adipic acid. The esterification reaction was carried out at a temperature progressively increased from 330° F. to 406°F. blowing nitrogen gas through the reaction mixture to facilitate removal of the water of reaction. The product ester composition consisted of 66.8% by weight of monomeric bis(hydroxyethyl) adipate and 33.2% by weight of ethylene glycol.

The copolyester of the indicated monomeric mixture was prepared by melt polymerization using antimony oxide as the catalyst. In the initial stage of the polymerization the ester mixture was heated about 30 minutes at atmospheric pressure at a temperature in the range of 428° F. to 482° F. with agitation. Then the composition was heated to increase the temperature to 536° F. under reduced pressure ranging from .5 to 1.5 mm. Hg, removing excess ethylene glycol by distillation. Heating was continued several hours until the copolyester product had an inherent viscosity of .68 determined as described in Example 1.

The molar proportions of dicarboxylic acid constituents corresponding to the esters in the reaction mixture were as follows:

| | Mol percent |
|---|---|
| Terephthalic acid | 40 |
| Isophthalic acid | 40 |
| Adipic acid | 10 |
| Sebacic acid | 10 |
| | 100 |

The copolyester product of Example 3 was dissolved in a solvent mixture consisting of 75% methyl ethyl ketone and 25% dioxane on a weight basis to form a liquid adhesive composition containing 20% by weight of the copolyester. This liquid adhesive composition was applied to the seam-forming surfaces 21 and 22 in an amount corresponding to about .8 mil dry adhesive coating on each surface. The body-blank was fabricated into a seamed body-shell and the adhesive confined in the seam-cavity was activated by heating the seam for 5 seconds at 325° F. The ultimate package prepared from this body shell and containing lubricating oil was non-leaking and withstood rough handling.

In another test, the copolyester adhesive product of Example 3 was satisfactorily applied as a preformed adhesive ribbon 2.5 mils thick to a body blank which was precoated on one side except at the seam-forming surfaces with an ordinary can coating varnish commercially used in the manufacture of sanitary containers for food packaging. The coating thickness corresponded to about 5 milligrams per square inch of coated surface. The resulting adhesive coated body blank was fabricated as a body-shell having the varnish as the interior coating of the shell. The adhesive ribbon confined in the seam cavity was activated by heating the locked seam for 5 seconds at 325° F. and then cooled. The package fabricated from this body-shell and containing lubricating oil was non-leaking. The heating required to activate and at least partially liquefy the adhesive confined to the seam cavity was insufficient to cause discoloration of the varnish on the interior wall of the container. With soldered side seams, soldering temperatures are sufficiently high to cause discoloration of either the interior sanitary varnish or the exterior decorative lithographing varnish in the vicinity of the seam. This discoloration is often defined as solder-scorching. Because of this condition and because the varnish may interfere with soldering, interior coating and exterior lithographing immediately adjacent to the seam has been heretofore avoided.

Specimen interiorly coated containers prepared as described having the respective side seams cemented and caulked with the copolyester adhesives of Examples 1, 2 and 3 were filled with water, sealed and subjected to heating in a steam pressure cooker for about two hours at 250° F. and then cooled to room temperature. The packages did not leak when subjected to these conditions corresponding to the maximum processing time and maximum temperature ordinarily used in the processing of wet-pack food products in the container.

Metal strips coated with the copolyester adhesive compositions of Examples 1, 2 and 3 were found to be resistant to aqueous extracts of food products ranging in pH value from about 2 to about 8 which ordinarily are packaged in tin-cans interiorly surfaced with sanitary enamels. Typical examples of such products are fruit juices, vegetable juices, meat extracts, soups, vegetable and animal oils and fats. The adhesives were resistant to carbonated beverages and aqueous alcoholic beverages such as beer and ale. This chemical resistance was determined under the physical conditions corresponding to heat-processing and pasteurization of the packaged food products. The copolyester adhesives did not discolor, soften or lose their adhesion to the substrate when in contact with these produtcs. The adhesives were also resistant to lubricants, gasoline, turpentine, paint diluents, paints, varnishes, lacquers, anti-freeze compositions, liquid polishes and cleaners, lighter fluid and other liquid products ordinarily packaged in tin-cans.

EXAMPLE 4

| | Parts by wt. |
|---|---|
| Copolyester of Example 1 | 17.00 |
| Methylene chloride | 82.15 |
| 2,4,6-toluene tri-isocyanate | .85 |
| | 100.00 |

This solution of copolyester adhesive was formed into a ribbon of adhesive by casting it as a self-supporting film about 2.5 mils thick and trimmed to .3 inch width. The ribbon was used as previously described to bond and caulk the seam of a container body-shell. The ribbon confined in the seam cavity was activated by heating the seam at 425° F. for 10 seconds. On cooling, the solidified adhesive adequately sealed and caulked the seam.

Specimen laminates having a simple lapped seam adhesively bonded with the copolyester cured with the polyisocyanate provided a practical increase in bond strength over the unmodified copolyester. This modified copolyester adhesive exhibited a slightly higher liquefying temperature than the unmodified copolyester represented by Example 1.

When the polyisocyanate content of the composition of Example 4 was doubled, that is, 10% based on the weight of the copolyester, only a slight further increase in bond strength was detectable.

Copolyesters of Examples 2 and 3 similarly modified with up to 10% by weight of a polyisocyanate, preferably containing three or four isocyanate groups per molecule, based on the weight of the copolyester, similarly provided detectable improvement in bond strength. Other polyisocyanates which can be substituted on an equal weight basis for the 2,4,6-toluene tri-isocyanate in modifying the copolyester adhesives include, for example, 3,4,4-triisocyanato diphenyl ether, triphenyl methane tri-isocyanate, butane-1,2,2-triisocyanate, 1,2,3,4-tetraisocyanato-butane, toluene diisocyanate, hexamethylene diisocyanate and dianisidine diisocyanate.

EXAMPLE 5

| | Parts by wt. |
|---|---|
| Terephthalate/adipate copolyester | 95 |
| Phenolic plasticizing oil-"Nevillac" TS | 5 |
| | 100 |

The terephthalate/adipate copolyester was the melt polymerization product of equal molar portions of dimethyl terephthalate and dimethyl adipate with excess ethylene glycol using a trace of zinc borate as the catalyst. After removal of the methanol, the polymerization as carried out under reduced pressure of about 1 mm. Hg at a temperature of 482° F. until the copolyester had an inherent viscosity of 0.35. The terephthalic acid component of this polymer was 50 mol percent and the adipic acid component was 50 mol percent based on the total dicarboxylic acid.

The phenolic plasticizing oil, "Nevillac" TS, was melt blended with the terephthalate/adipate copolyester. Presence of this plasticizer in the adhesive composition lowered the melting temperature and the viscosity of the melt to improve the hot-melt application characteristics.

This adhesive composition was applied as an extruded hot-melt at 325° F. to one of the seam-forming hooks of the container body blank. The resulting adhesive coated blank was formed into a seamed body-shell and the adhesive confined to the locked seam cavity was activated by heating the seam for 5 seconds at 325° F. On cooling to room temperature, the seam was adequately cemented and caulked.

Containers fabricated from this cemented body-shell were found to be suitably seamed to withstand physical and chemical conditions associated with processing of aqueous food and beverage products in the container. The plasticizing oil is more soluble and less resistant than the terephthalate copolyester. Consequently, it is desirable to use a minimum proportion of the modifying plasticizer.

Although the several examples for the sake of brevity show but a few particularly preferred species of useful terephthalate copolyesters, polymeric esters defined as follows can be used in place of the copolyesters specifically described in the examples: polymeric ester products of a benzenedicarboxylic acid component comprising terephthalic acid, at least one saturated aliphatic dicarboxylic acid having the general formula

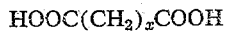

$$HOOC(CH_2)_xCOOH$$

where $x$ is an integer ranging from 2 to 8, and at least one polymethylene glycol having from 2 to 6 methylene groups per molecule. In order to obtain the desired physical properties and chemical inertness, the terephthalic acid component represents at least 30 mol percent of the total dicarboxylic acid. The aliphatic dicarboxylic acid represents 15 to 60 mol percent of the total dicarboxylic acid. The molar ratio of polymethylene glycol to the dicarboxylic acids is in the range of greater than 1 and less than 1.67. The copolyester molecules are preferably terminated with hydroxyl substituents, hence the number of mols of polymethylene glycol exceeds the mols of dicarboxylic acid. The simplest conceivable polyester corresponds to 1 mol of terephthalic acid, 1 mol of the aliphatic dicarboxylic acid and 3 mols of polymethylene glycol; hence, the maximum molar ratio of 1.67.

Preferred terephthalate copolyesters have a molecular weight corresponding to an inherent viscosity in the range of 0.5 to 1.2 based on the relative viscosity of a solution of 0.6 gram of the copolyester in 100 ml. of meta cresol. Terephthalate copolyesters having an inherent viscosity in the range of .25 to 1.5 are operative. For practical hot-melt application, most desirable melt characteristics are associated with the copolyesters having an inherent viscosity in the range of .25 to .85. Lower molecular weight copolyesters are not as physically resistant, chemically resistant and age resistant as the higher molecular weight species defined by the preferred range of inherent viscosity. These lower molecular weight species can be up-graded by modification with polyisocyanates. The higher molecular weight species are conveniently applied from solution or as a pre-shaped strip. Copolyesters having an inherent viscosity greater than 1.5 are difficultly solubilized and application from dilute solution is impractical for container fabrication. Activation of such copolyesters in the seam cavity is at an impractically high temperature.

The benzenedicarboxylic acid component of the copolyester can be solely terephthalic acid, mixtures of terephthalic and isophthalic acids or mixtures of terephthalic, isophthalic and orthophthalic acids. In ternary mixtures of these benzenedicarboxylic acids it is desirable that the orthophthalic acid is a minor component preferably not exceeding about 5% by weight of the total benzenedicarboxylic acid. The practical minimum content of terephthalic acid is 30 mol percent based on the total dicarboxylic acid in order to provide the copolyester adhesive with desired toughness and chemical resistance. About 70 mol percent of terephthalic acid is a practical maximum. Higher proportions introduce disadvantages such as high softening or melting temperatures and significantly limited solubility which are impractical in applying and activating the copolyester adhesive in container fabrication. Isophthalic acid advantageously can be used in admixture with the terephthalic acid. The isophthalic acid improves the aging of certain terephthalic acid copolyesters by inhibiting or retarding crystallinity. When the benzenedicarboxylic acid component includes isophthalic acid the molar ratio of isophthalic acid to terephthalic acid is preferably in the range of .25 to 1.0 per mol of terephthalic acid.

The saturated aliphatic dicarboxylic acid component can be a single acid or a mixture of acids selected from the group consisting of sebacic, adipic, succinic, pimelic, glutaric, suberic and azelaic. Any of these dicarboxylic acids or mixtures thereof can be substituted on a molar basis for the content of aliphatic saturated dicarboxylic acid of the examples or used within the proportions corresponding to 15 to 60 mol percent based on the total dicarboxylic acid. Higher proportions of the saturated aliphatic dicarboxylic acids result in rubbery, soft copolyesters which are not adequately physically and chemically resistant as a solder-replaceable cement in container fabrication. When a mixture of two such saturated aliphatic acids is used, it is advantageous for the two acids to differ by at least three carbon atom in chain length. A mixture of sebacic acid and adipic acid in substantially equal molar proportions is particularly desirable.

The esterifiable dihydric alcohol component can be any polymethylene glycol having from 2 to 6 carbon atoms per molecule or mixtures of such glycols. Any of these polymethylene glycols or mixtures thereof can be substituted for ethylene glycol on a molar basis in the examples. Ethylene glycol is the particularly preferred dihydric alcohol component. It is desirable to minimize the chain length of the acyclic saturated aliphatic components separating the benzenedicarboxylic acid components in the copolyester chain. This is conveniently accomplished by using the lowest molecular weight dihydric alcohol and using only such modifying proportions of aliphatic dicarboxylic acid which provides the copolyester with the desired balance of physical and chemical properties.

These terephthalate copolyesters are preferably prepared by the melt polymerization method described in Snyder U. S. Patents 2,623,031 and 2,623,033.

The terephthalate copolyester adhesive can be applied to the metal body blank by any of the means ordinarily used in cementing operations involving adhesive solutions, adhesive dispersions, adhesive organosols, pre-formed adhesive strips, ribbons and tapes, or hot-melt adhesives. Application of the adhesive from solution or dispersion in a volatile organic diluent or as a pre-formed solid strip or ribbon of adhesive is ordinarily preferred over hot-melt application. Inasmuch as one of the pertinent characteristics of the terephthalate copolyester is chemical resistance, solubility in volatile organic solvents is limited. Suitable solvents which can be used to dissolve the copolyester at a practical concentration include methylene chloride, 1,1,2-trichloroethane, dioxane, dimethylformamide, chloroform, cyclohexanone, diacetone alcohol, dimethyl sulfoxide, nitromethane, tetrahydrofuran, butyrolactone, "Carbitol" acetate, toluene, benzyl alcohol and methyl ethyl ketone.

The terephthalate copolyester adhesives preferably are used without admixture with modifying components. However, compatible and innocuous plasticizers and thermoplastic resins can be blended with the copolyester in minor proportions, such as up to 10% by weight of the adhesive. However equivalent properties of the blend often can be obtained by appropriate variation in the proportions of esterifiable components used in preparation of the copolyester. Dicyclohexyl phthalate and 2-ethylhexyl phthalate are suitable plasticizers when the copolyester is used to cement the seam of food and beverage containers. Chlorinated diphenyl, tricresyl phosphate and other aryl and alkyl phosphate plasticizers can be used to modify the copolyester adhesive when the containers are used for non-food products. These plasticizers can be substituted on an equal weight basis for the phenolic plasticizing oil "Nevillac" TS in Example 5 and similarly used to modify the copolyesters of the preceding examples.

The copolyester adhesive can be modified with extender pigments, fillers and colored pigments when such modification serves a useful purpose such as for gauging the thickness of the applied adhesive, to match the interior enamel coating or to simulate solder by including aluminum pigment. However, the copolyester adhesive preferably is used as a clear, unextended product.

Although the invention is primarily directed to solder-free cemented side-seam tin-cans, use of the invention can be equally extended to fabrication of other sheet metal containers having a body side-seam. The metal substrate can be any metal ordinarily used in container fabrication such as tin-plated sheet steel, terne plate, black sheet iron, aluminum, aluminum coated steel, copper, brass and zinc. The metal substrate can include a protective innocuous organic coating serving as a sanitary interior lining of the ultimate seamed body-shell or serving as a decorative finish on the exterior of the body-shell. Drying oil varnishes, epoxy-polyether resin coatings, polybutadiene oil compositions and vinyl resins are commonly used for this purpose.

Can making machines are capable of fabricating the container at a rate approaching 10 per second and for an adhesive to be suitable as a solder replacement in such operations, it must be adaptable to such a schedule. Copolyesters useful in the practice of this invention confined in the seam cavity of the body side-seam can be adequately heat-activated and liquefied by exposure to a melt temperature in the range of 300° F. to 550° F. for a period of about 5 seconds. In some instances when the heat transfer is rapid, adequate heat-activation of the copolyester adhesive can be accomplished in a period as short as 2 seconds. Longer exposure to melt temperatures can be used, but there is no practical advantage in heat-activating the seam-confined adhesive for longer than 60 seconds. Some containers are interiorly coated or exteriorly lithographed after fabrication with the coating baked for 5 to 15 minutes at a temperature ranging as high as 425° F. Copolyester adhesive confined in the seam cavity is not detrimentally affected by exposure to baking temperatures and baking cycles ordinarily used in container manufacture. The adhesive-confining seam can be subjected to temperatures as high as 700° F., soldering temperature, for several seconds without hazard. However, significantly longer exposure to a temperature above 550° F. results in deterioration or decomposition of the adhesive. The preferred heat-activating temperature is in the range of 325° F. to 425° F. Higher activation temperatures are preferably avoided to minimize discoloration of any protective or decorative organic coatings applied to the body blank prior to fabrication of the seamed body-shell.

Metal laminates and side-seams of body-shells of metal containers cemented and caulked in accordance with the practice of this invention showed that the copolyester adhesive was adequately resistant to flow at 250° F. to permit sterilization of such cemented containers, and exhibited no cold flow at room temperature. The physical, chemical, aging and stability characteristics of the terephthalate copolyester adhesives of this invention most closely approach the cardinal requirements of an organic substitute for metal solder in the fabrication of solder-free, cemented side-seam containers used for packaging wet-pack food products and beverages.

While there are disclosed above but a limited number of embodiments of the copolyester adhesives, processes and products of the invention, it is possible to produce still other embodiments without departing from the inventive concept herein disclosed, and it is desired therefore that only such limitations be imposed on the appended claims as are stated therein or required by the prior art.

The embodiments of the invention in which an exclusive property or privilege is claimed are defined as follows:

1. In the method of fabricating a tubular sheet metal can-body shell having a solder-free interengaged and locked side-seam containing a sealant confined in the seam-cavity defined by the locked seam comprising the steps of (1) stamping a flat can-body blank from a ribbon of sheet metal, the can-body blank having appropriate portions at opposite ends of said blank formable into a companion pair of seam hooks, (2) forming said seam-formable portions of the blank into companion seam hooks, (3) shaping the can-body blank into a partially completed tubular body having the companion seam hooks interengageable and (4) interengaging and locking said pair of seam hooks and thereby confining a sealant in the seam-cavity, the improvement which consists of the combination of the steps (a) applying to at least one of the seam-formable portions of said flat metal can-body blank prior to said step (2), a fusible terephthalate copolyester sealing-adhesive in an amount corresponding to 1 to 10 mils dry adhesive thickness sufficient to substantially fill said seam-cavity, (b) heating said confined adhesive, subsequent to said step (4), for 2 to 60 seconds at a temperature of 300° F. to 550° F., sufficient to fuse in situ said adhesive and (c) cooling said fused adhesive below the melt temperature thereof, said sealing-adhesive consisting essentially of the copolymeric esterification product of a mixed dicarboxylic acid reactant composed essentially of 40 to 85 mol percent of a benzene-dicarboxylic component including terephthalic acid in an amount from 30 to 70 mol percent, and correspondingly 60 to 15 mol percent of at least one aliphatic dicarboxylic acid of the general formula $HOOC(CH_2)_xCOOH$, where X is an integer from 2 to 8, and an aliphatic diol reactant composed essentially of at least one $C_2$ to $C_6$ polymethylene glycol, said diol reactant being in molar excess of said mixed dicarboxylic reactant and at a ratio less than 1.67 mols per mol of the dicarboxylic acids, said copolyester being further characterized by an inherent viscosity of .25 to 1.5, based on a solution of .6 gram of the copolyester in 100 ml. of m. cresol.

2. The combination of steps of claim 1 wherein said step (a) consists essentially of applying said adhesive to at least one of said seam-formable portions as a solution of said terephthalate copolyester in a volatile organic solvent for the copolyester and volatilizing the solvent therefrom, an adhering dry solid residue of said copolyester being deposited thereby.

3. The combination of steps of claim 1 wherein said step (a) consists essentially of applying said adhesive as a preformed dry solid strip to at least one of said seam-formable portions of the metal can-body blank, said adhesive-receiving seam-formable metal portion being in a preheated state of localized heat sufficient to melt the surface of said adhesive strip in contact with the metal, said applied adhesive strip on cooling thereby being anchored sufficiently to resist delamination during subsequent mechanical operations of can-body fabrication.

4. The method of claim 1 wherein said adhesive application step (a) consists essentially of applying said adhesive as a hot-melt composition.

5. The method of claim 1 wherein said step (b) of in situ fusing of said adhesive is carried out at a temperature from 325° F. to 425° F.

References Cited in the file of this patent

UNITED STATES PATENTS

| | | |
|---|---|---|
| 2,323,966 | O'Leary | Aug. 17, 1943 |
| 2,430,010 | Geertsen | Nov. 4, 1947 |
| 2,455,938 | Martin | Dec. 14, 1948 |
| 2,581,751 | Chase, Jr., et al. | Jan. 8, 1952 |
| 2,623,031 | Snyder | Dec. 23, 1952 |
| 2,623,033 | Snyder | Dec. 23, 1952 |
| 2,727,301 | Magnus | Dec. 20, 1955 |
| 2,730,983 | Campbell, Jr., et al. | Jan. 17, 1956 |